United States Patent [19]

Browning et al.

[11] Patent Number: 5,348,310

[45] Date of Patent: Sep. 20, 1994

[54] DOUBLE SPIRAL-WOUND GASKET ASSEMBLY WITH LEAK DETECTION

[75] Inventors: Calvin J. Browning; Carl D. Mercer; William S. Milligan, all of Baton Rouge, La.

[73] Assignee: The Dow Chemical Company, Midland, Mich.

[21] Appl. No.: 997,437

[22] Filed: Dec. 28, 1992

[51] Int. Cl.⁵ .............................. F16T 15/32
[52] U.S. Cl. ............................ 277/1; 277/2; 277/180; 277/203; 285/93
[58] Field of Search ............... 277/1, 2, 180, 203, 277/204, 15, 16, 17; 285/93

[56] References Cited

U.S. PATENT DOCUMENTS

| | | | |
|---|---|---|---|
| 4,309,039 | 1/1982 | Irick | 277/204 X |
| 4,410,186 | 10/1983 | Pierce, Jr. | 277/2 |
| 4,673,187 | 6/1987 | Hanson et al. | 277/204 X |
| 4,888,979 | 12/1989 | Steeper | 277/2 X |
| 5,090,871 | 2/1992 | Story et al. | 285/93 X |
| 5,149,105 | 9/1992 | Beaver et al. | 277/2 X |

FOREIGN PATENT DOCUMENTS

| | | | |
|---|---|---|---|
| 3144578 | 5/1983 | Fed. Rep. of Germany | 277/2 |
| 0373934 | 1/1964 | Switzerland | 277/2 |
| 0854189 | 11/1960 | United Kingdom | 277/2 |
| 2032562 | 5/1980 | United Kingdom | 285/93 |
| 2131497 | 6/1984 | United Kingdom | 277/2 |
| 2143596 | 2/1985 | United Kingdom | 277/2 |

OTHER PUBLICATIONS

Kempchen Packing Compensations Catalog, Section 5.4, Manufactured by Kempchen & Co. GmbH.

*Primary Examiner*—William A. Cuchlinski, Jr.
*Assistant Examiner*—Daniel G. DePumpo

[57] ABSTRACT

A gasket assembly with double spiral-wound gaskets and a middle draw-off port for leak detection in service with a process fluid featuring 1) an inner primary seal spiral-wound gasket with a high spring rate to hold the process fluid and pressure, 2) an outer secondary seal spiral-wound gasket with a lower spring rate to hold the process fluid temporarily while a new gasket is being installed, 3) inner and outer compression/gauge rings that allow compression of the spiral-wound gaskets to the proper thickness, and 4) a middle compression ring between the two spiral-wound gaskets that also provides a groove on each side in communication with a draw-off port for monitoring leakage from the inner gasket.

8 Claims, 5 Drawing Sheets 5,348,310

DOUBLE SPIRAL-WOUND GASKET ASSEMBLY WITH LEAK DETECTION

BACKGROUND OF THE INVENTION

This invention relates generally to the area of leak detection in flanged joints. More particularly the invention relates to an apparatus and method for detecting a leak of hazardous material across a specific flanged joint in a multiflanged connection in refinery or chemical process equipment.

Gaskets are well known as sealing devices between two surfaces such as the flanged ends of pipe sections, reactor flow tubes, closures on chemical process vessels and the like. Generally such gaskets are retained between the two surfaces by bolts or other fasteners and their purpose is to prevent leakage of fluid material between the flanges. This is particularly important in processes involving flammable, hazardous, or toxic chemicals. With the growth of environmental regulations requiring control of fugitive emissions, the ability to rapidly detect leakage of these materials and to take the necessary corrective steps to stop such leakage is very important. Leak detection methods are currently employed in the chemical and petrochemical process areas but some of the methods used, such as sniffing each flange from the outside with an analytical device, have inherent safety-related drawbacks, as well as, being significantly time consuming. They also do not exclude contaminants that may be in the outdoors environment thereby possibly leading to incorrect results during the leakage check.

There are also gaskets on the market that claim to have leakage detection systems. These systems also have some drawbacks in that the exhausting system can be damaged and made inoperable by high-bolting pressure, particularly where the exhausting system utilizes a vacuum system. Contamination of samples can also occur with backflow of materials utilized in a vacuum system thereby leading to inaccurate results. Also, some of the commercial gaskets are flange specific in that they have to be tailor-made to fit the desired flange. This can lead to logistical problems where specific gaskets and specific flanges would have to be inventoried or specially ordered when one has to be replaced.

SUMMARY OF THE INVENTION

It is an object of the present invention to provide a flange assembly that incorporates features to overcome the problems listed above as well as providing an apparatus and method for improving the detection of leaks across flanged joints. It is another object of the invention to provide an apparatus that is deployable in any flanged joint capable of utilizing a spiral-wound gasket; a still further object is to provide a novel gasket assembly having leak detecting capability; and it is still another object of the invention to provide a system that can constantly monitor a plurality of flanges individually from ground level thereby dramatically reducing safety concerns in leak detection systems.

The present invention features a double spiral-wound gasket assembly having a middle draw-off port, and preferably consisting of monitoring holes spaced 180° apart, for leakage detection. The assembly consists of an inner compression and gauge ring; an inner primary seal spiral-wound gasket having a high spring rate for enabling this inner gasket to receive more of the bolt load in the flange assembly to aid in sealing against high process pressure; a middle compression and gauge ring with a draw-off port for leak monitoring which middle ring contains a groove on each side that is protected from crushing by the middle compression and gauge ring; a secondary seal spiral-wound gasket having a lower spring rate than the primary seal spiral-wound gasket, and providing a seal for a monitoring gas and also preventing any leakage from the primary gasket going to the atmosphere; an outer compression gauge and guide ring that centers the gasket on the flange by utilizing bolting as a guide while providing proper compression of the gasket preventing gasket blow out. Each flange in the assembly has monitoring channels drilled through 180° apart that allows a monitoring fluid to constantly purge through the flange and gasket assembly to a monitoring station such that each flange can be monitored individually.

In a spiral-wound gasket, a preformed metal strip is wound around a gasket filler material thus forming a spiral-wound gasket. The number of metal strip windings per gasket width for a given size of gasket determines whether it has a "high spring rate" or a "low spring rate," since the spring rate is dependent on the number of windings of springs. The more windings there are in the spiral-wound gasket, the higher the spring rate. Spring rate, as used herein, is defined as the load that produces unit deformation of the spring. Service conditions, such as bolting pressure, normally dictate the spring rate necessary for the gasket to hold its seal. A "high spring rate" means that the spiral-wound gasket is designed to handle high seating stresses such as 10,000 psi and above, and a "low spring rate" means that the spiral-wound gasket is designed to perform under much lower seating stress values that are well below 10,000 psi. Under the same loading a gasket having a "low spring rate" will compress more than one having a "high spring rate".

BRIEF DESCRIPTION OF THE DRAWINGS

So that the manner in which the above recited features, advantages, and objects of the present invention can be more fully understood, a more particular description of the invention summarized above may be had by reference to the drawings which form a part of this specification. The drawings are not to be considered as limiting the scope of the invention. Also like reference numbers refer to like parts in each of the Figures of the Drawings.

In the drawings.

DETAILED DESCRIPTION OF THE PREFERRED EMBODIMENTS

Figure 1:
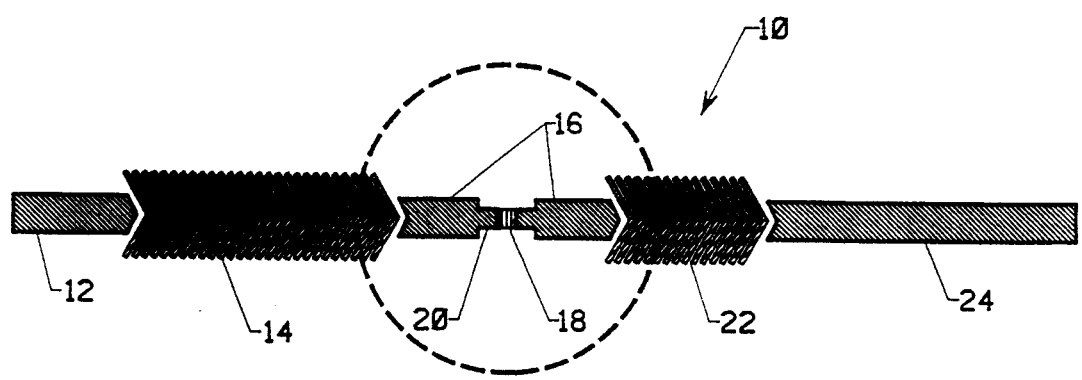
FIG. 1 is a partial sectional view of one-half of the gasket assembly showing the compression and gauge guides, the double spiral-wound gaskets and the groove and draw-off port therethrough.

Referring now to the drawings and particularly to FIG. 1, a leak detecting gasket assembly 10 is shown having a flat inner compression and gauge ring 12 having an inner and an outer edge abutting the inner winding of a primary seal spiral-wound gasket 14. This ring 12 in a pressurized system, is designed to keep process fluids from building up next to the gasket assembly 10 while supporting the primary seal spiral-wound gasket 14 and preventing it from unwinding. Additionally, the gauge ring 12 provides an additional compression stop to prevent over compression of the spiral-wound gasket 14. The primary seal spiral-wound gasket 14 provides the primary seal for the gasket assembly 10 and is designed to seal against pressure fluids in piping systems or vessels. A middle compression and gauge ring 16 abuts the outer winding of primary seal spiral-wound gasket 14 and is designed having a draw-off port 18, consisting of monitoring holes 180° apart, the geometric shape of which is not critical to the invention, for leak monitoring purposes, and a groove 20, the geometric shape of which is not critical to the invention, on each side of the middle compression and gauge ring 16 in communication with draw-off port 18. The middle compression and gauge ring 16 is an essential feature of the invention by providing a compression stop for the gasket 14 and the flow monitoring groove 20 thereby enabling groove 20 to retain its structural integrity when the gasket assembly 10 is bolted in place in the process. The middle compression and gauge ring 16 also acts to prevent unwinding of spiral-wound gaskets such as spiral-wound gasket 14. Groove 20 is on both sides of middle compression and gauge ring 16 allowing monitoring fluid to flow through the gasket assembly 10 on both sides and then through the draw-off port 18 to a monitoring station 42 generally shown in this figure. A secondary seal spiral-wound gasket 22 has its inner winding abutting the outer edge of middle compression and gauge ring 16 and has a lower spring rate than primary spiral-wound gasket 14 and provides a seal against any unwanted leakage to the atmosphere. The secondary seal spiral-wound gasket 22 function as a seal for the process fluid in the event the primary seal 14 fails. Both the primary and secondary spiral-wound gaskets are thicker than the gauge rings, projecting a significant distance on either side of the gauge rings. An outer compression gauge and guide ring 24 abuts the outer winding of secondary seal spiral-wound gasket 22 and centers the gasket assembly 10 on a flange by utilizing bolting or other fastening means as a guide. The outer compression gauge and guide ring 24 also provides for proper compression of spiral-wound gaskets 14 and 22 and blow-out prevention as well as preventing the unwinding of the secondary spiral-wound gasket. In a vacuum operated system the secondary spiral-wound gasket 22 acts as a primary seal to prevent any incursion of fluids from the environment while the primary spiral-wound gasket 14 acts as the secondary seal.

Figure 2:
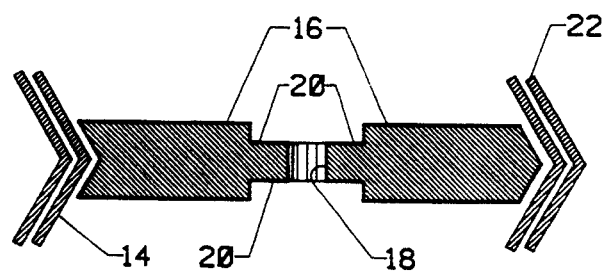
FIG. 2 is an enlarged sectional view of the middle compression and gauge ring shown in FIG. 1 including a draw-off port and a groove on both sides of the gauge ring.

FIG. 2 is an expanded sectional view of the middle compression and gauge ring 16 including a draw-off port 18 and groove 20. Having a groove 20 on both sides of the middle compression and gauge ring 16 allows detection of leakage from both sides of gasket 14 and gasket 22 through the draw-off port 18 while only having to monitor one side of the gasket 14.

Figure 3:
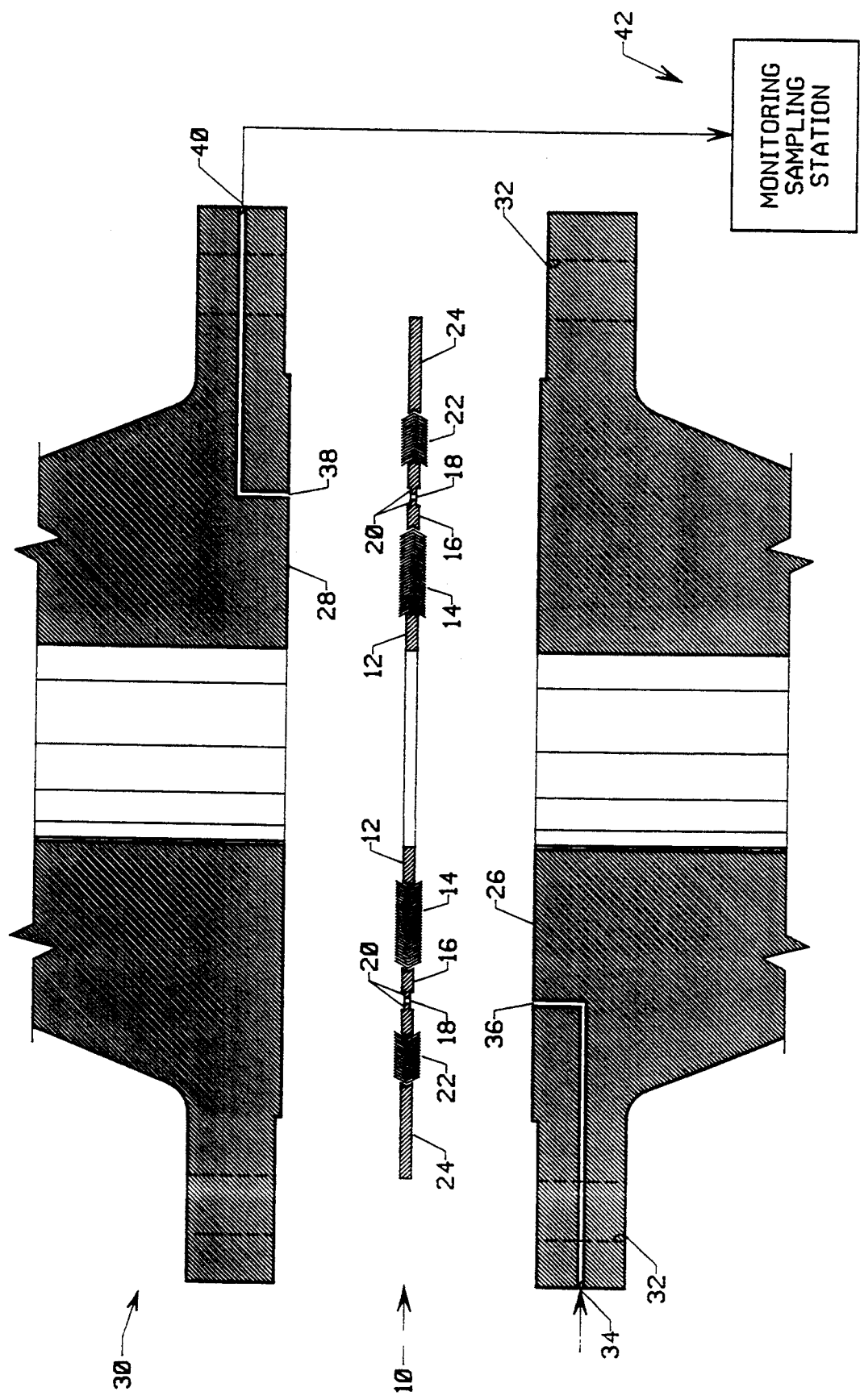
FIG. 3 shows a sectional view of a flange assembly including the gasket assembly in between a pair of flanges with means for the flow of monitoring fluid through opposite flanges depicted.

Referring now to FIG. 3, gasket assembly 10 is shown between opposing faces 26 and 28 of a flanged joint 30 with means for bolting flange faces 26 and 28 together. Monitoring fluid flow path 34 is shown whereby a purge gas, preferably nitrogen, not shown, passes through a port 36, shown in flange face 26, through draw-off port 18 in groove 20 of gasket assembly 10 where it is combined with any leaking fluid from spiral-wound gaskets 14 or 22 and exits through a port 38 in opposite flanged face 28 and on through flowpath 40 to a monitoring station 42 as generally shown schematically in FIG. 3.

Figure 4:
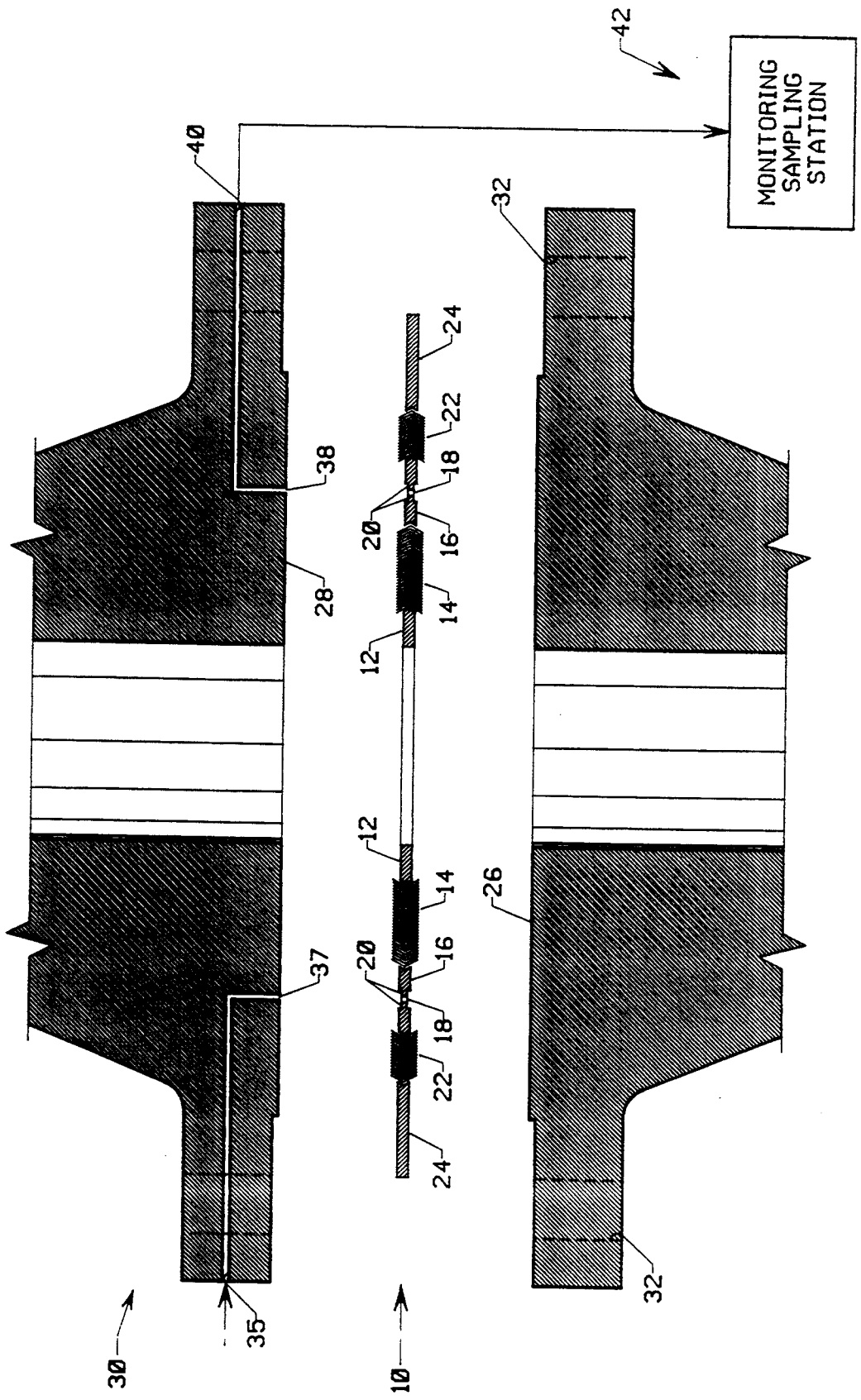
FIG. 4 is the same view as FIG. 3 with the monitoring fluid flow shown in the same flange.

In FIG. 4 the operation of purging as shown in FIG. 3 is described with an embodiment of being able to monitor and purge both monitoring fluid and any leakage through the same side of flange face 28 through monitoring flowpath 35, port 37, port 38 through flowpath 40 and on to monitoring station 42 as generally shown schematically in FIG. 4. Obviously the same side flow situation would also be applicable to flange 26.

Figure 5:
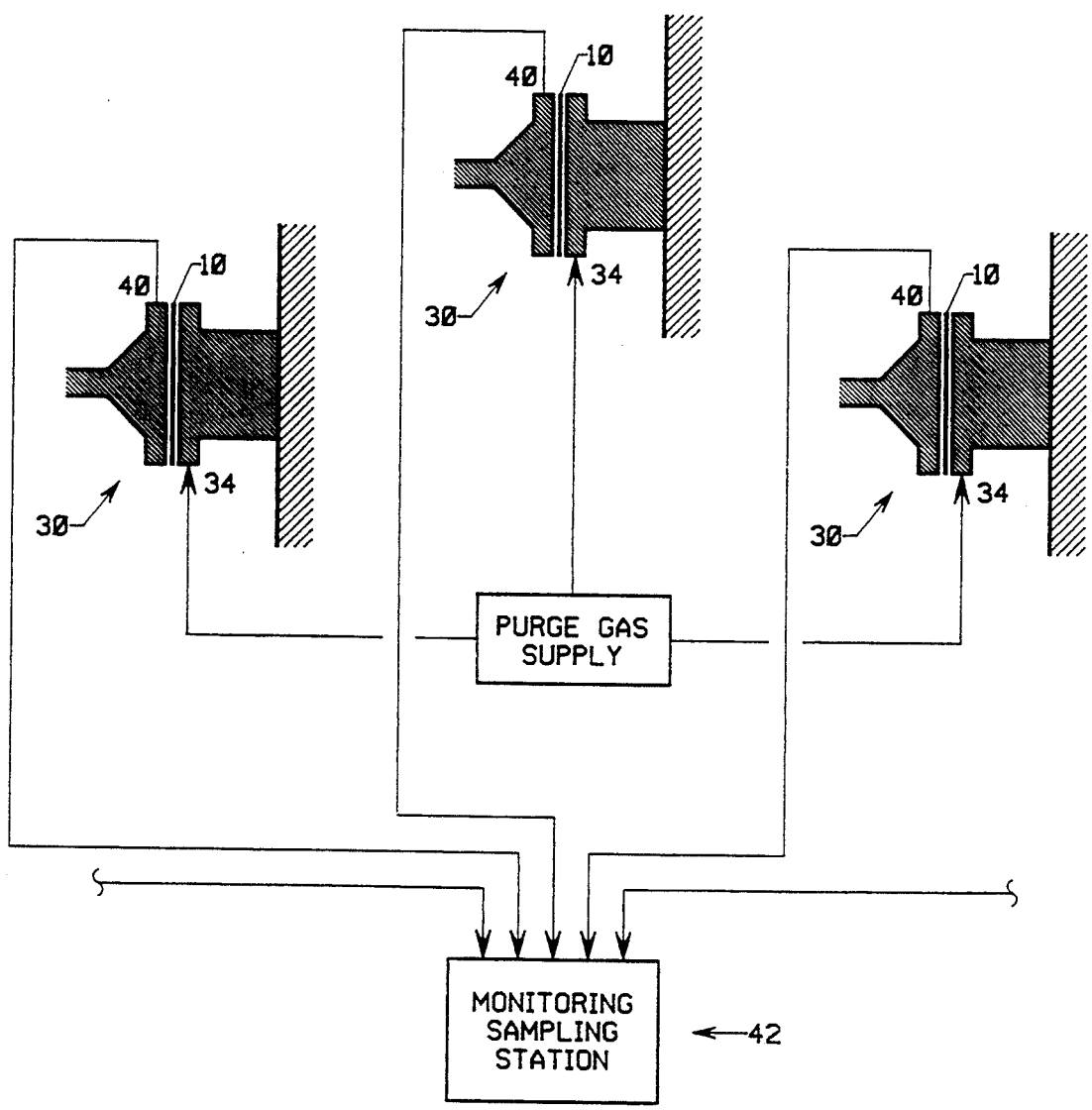
FIG. 5 depicts in partial sectional and schematic view the monitoring fluid flow through opposite flanges in the system and FIG. 6 is the same view as FIG. 5 depicting in partial sectional and schematic view the monitoring fluid flow through the same side of a series of flanges.
Figure 6:
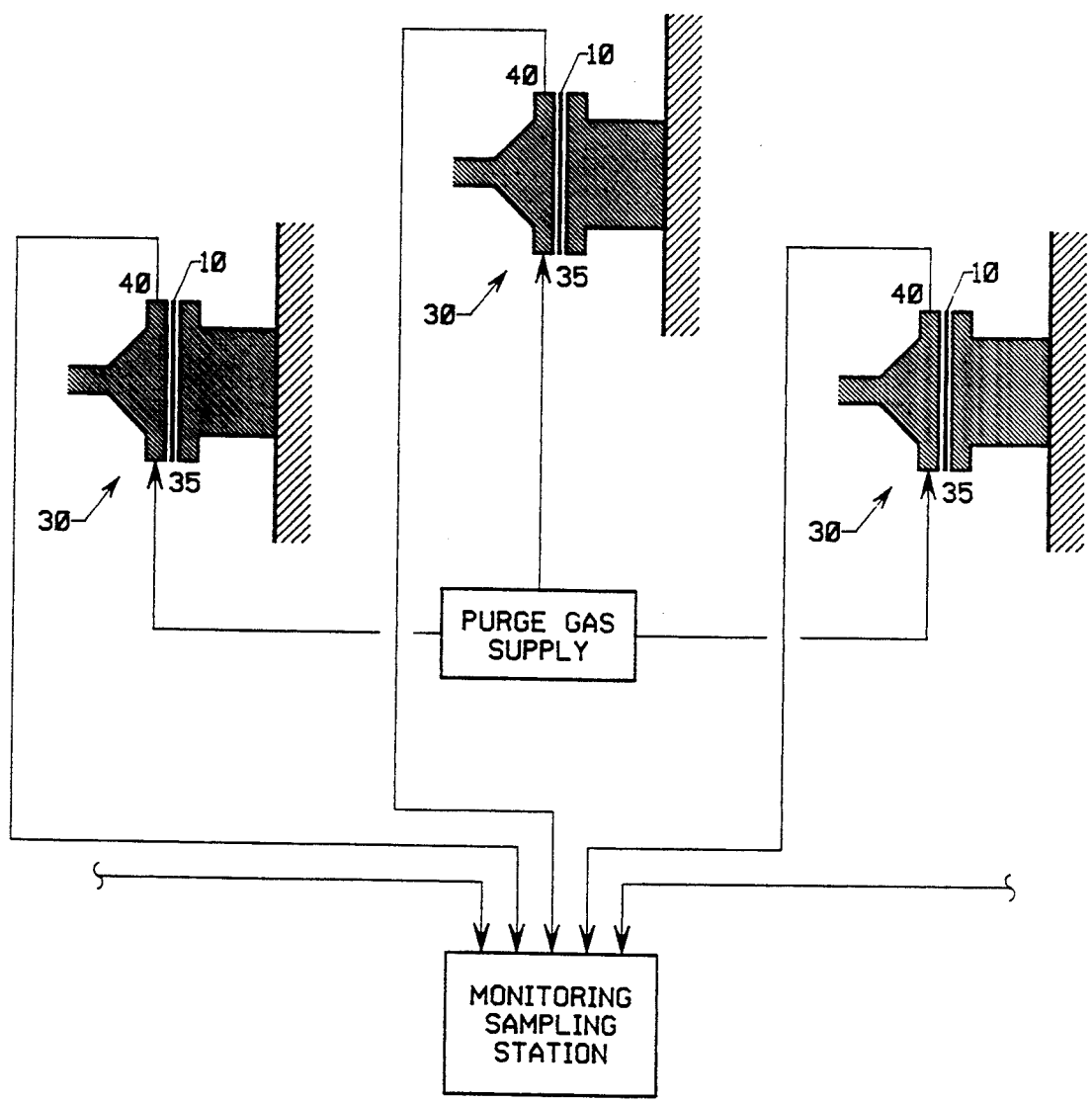

FIG. 5 illustrates opposite face gas flow patterns, illustrated in FIG. 3 in a series of flange assemblies as would be found in a chemical processing plant and FIG. 6 illustrates the same side fluid flow embodiment, illustrated in FIG. 4, in a series of flange assemblies. Both FIG. 5 and FIG. 6 further depict another preferred embodiment of the present invention in that individual flange assemblies can be monitored independently of any other flange assembly, thereby allowing for determining exactly which flange assembly is leaking. The invention also eliminates a problem common with other known leak detection means in that background contamination is of no concern in this closed system. FIG. 6 also allows for installation of monitoring systems with standard equipment with modifications of piping only.

In one preferred embodiment, the gasket assembly 10 comprises, from an inner to an outer diameter, an inner compression gauge ring 12 having an inner and an outer edge. This ring abuts a first spiral-wound gasket 14 constituted by a plurality of turns of a profiled metal strip wound upon itself to form a spiral and a number of turns of a filler material, using available gasket materials such as graphite, PTFE, asbestos, non-asbestos, and the like interposed between the metal strips. The inner compression gauge ring 12 helps prevent the spiral-wound gasket 14 from unwinding. Abutting the first spiral wound gasket 14 is a middle compression gauge ring 16 that has a centrally located groove 20 on each side for collecting any fluid leakage. The groove 20 has a draw-off port 18 and serves as a path for nitrogen monitoring gas on both sides of the middle compression and gauge ring 16. This middle compression and gauge ring 16 prevents the groove 20 from being deformed when the gasket assembly 10 is fastened between opposing flange faces 26 and 28. Attached to the outer edge of the middle compression and gauge ring 16 is a second spiral-wound gasket 22 constructed similarly to the first spiral-wound gasket 14. While the latter is designed to hold under the pressure of the process, the former is designed to perform both as a backup for the former and as a seal to the outside. In vacuum operated systems the roles of the spiral-wound gaskets are reversed. An outer compression gauge ring 24 abuts the outside of the outer winding of the second spiral-wound gasket 22. The gasket assembly 10 is designed so as to fit between flange faces 26 and 28 without the need for shaping the faces to fit the gasket assembly 10. Most of the flanges used in the chemical process industry are listed as raised-face flanges and are generally bolted together. The flanges in the invention have fluid routing means drilled through so as to be in communication with the monitoring carrier fluid assembly at one end and being in communication with a means for analyzing the monitoring carrier fluid at an opposite end. This arrangement eliminates the problem of fluids outside of the flange from contaminating the carrier fluid and thus ensures the integrity of materials to be analyzed.

A preferred embodiment of a flange assembly 30 for detecting process fluid leakage incorporates affixing the double spiral-wound gasket assembly 10 between opposing faces 26 and 28 of two flanges, each of which or one of which, respectively, has a monitoring entrance and exit hole 36 on the periphery of the flange, a channel in the flange 34 for passing a carrier gas from the peripheral hole into the space between the flanges, bolting the flanged faces 26 and 28 together, and flowing a monitoring carrier fluid through the flowpath 34 of one side of the flange assembly 30 through the groove 20 and draw-off port 18 in the middle compression and gauge ring 16 where any fluid leakage is picked up and transported by the monitoring carrier fluid through flowpath 40 in the opposite side of the flange assembly 30 to an analytical device such as an infrared spectrometer, not shown, or a gas chromatograph coupled to a mass spectrometer, also not shown, such that deviation in the make up of the monitoring fluid, such as contamination by process fluid leakage, can be determined.

In another preferred embodiment, as shown in FIG. 4, with the middle compression and gauge ring 16 having a groove 20 on each side with a draw-off port 18 connecting them, it is possible to flow the monitoring carrier fluid through only one side of a flange assembly such as through flowpath 35, port 37, groove 20, draw-off port 18, port 38, and flowpath 40 and then on to a monitoring station 42.

In view of the foregoing it is respectfully submitted that the present invention is well adapted to attain all the objects and features mentioned hereinabove along with other features which are inherent in the gasket assembly, flange assembly and leakage detection system themselves.

What is claimed is:

1. A gasket assembly, comprising from an inner to an outer diameter:
   a) an inner compression gauge ring having an inner and outer edge;
   b) a first spiral-wound gasket having an inner and an outer winding, said inner winding wrappingly abutting the outer edge of said inner compression gauge ring;
   c) a middle compression and gauge ring having an inner and an outer edge, said inner edge abutting the outer winding of said first spiral-wound gasket and having a centrally located groove in both an upper face and a lower face of said middle compression ring for collecting fluid leakage past said first spiral-wound gasket said centrally located grooves having drawoff ports therethrough whereby fluid collected in said grooves can be monitored by a sensing device;
   d) a second spiral-wound gasket having an inner and an outer winding, said inner winding wrappingly abutting the outer edge of said middle compression ring; and
   e) an outer compression gauge ring having an inner and an outer edge, said inner edge abutting the outer winding of said second spiral-wound gasket.

2. A gasket assembly as in claim 1 wherein said first and said second spiral-wound gaskets are thicker than said compression gauge rings thereby allowing for compression of said spiral-wound gaskets.

3. A gasket assembly as in claim 1 wherein said inner compression and gauge ring supports said first spiral-wound gasket and prevents it from unwinding.

4. A flange assembly for detecting the leakage of process fluid between the flanges of a process unit connection or pipeline, said flange assembly comprising a gasket assembly comprising from an inner to an outer diameter:
   a) an inner compression gauge ring having an inner edge and an outer edge;
   b) a first spiral-wound gasket having an inner and an outer winding, said inner winding wrappingly abutting the outer edge of said inner compression gauge ring;
   c) a middle compression gauge ring having an inner and an outer edge, said inner edge abutting the outer winding of said first spiral-wound gasket and having a centrally located groove in both an upper face and a lower face of said middle compression ring for collecting fluid leakage past said first spiral-wound gasket said centrally located groove having drawoff ports therethrough, whereby fluid flow past said gasket can be monitored by a sensing device;
   d) a second spiral-wound gasket having an inner and an outer winding, said inner wrappingly abutting the outer edge of said second spiral-wound gasket; and
   e) an outer compression gauge ring, having an inner and an outer edge, said inner edge abutting the outer winding of said second spiral-wound gasket.

5. A flange assembly as recited in claim 4 wherein said carrier fluid is a gas which is selected from helium and nitrogen.

6. A method fop detecting process fluid leakage between flanges of a process unit or pipeline, comprising the steps of:
   a) affixing between a pair of opposing flanges a double spiral-wound gasket assembly comprising from an inner to an outer diameter;
      1) an inner compression gauge ring having an inner and an outer edge;
      2) a first spiral-wound gasket having an inner and an outer winding, said inner winding wrappingly abutting the outer edge of said inner compression gauge ring;
      3) a middle compression gauge ring having an inner and an outer edge, said inner edge abutting the outer winding of said first spiral-wound gasket and having a centrally located groove in both an upper face and a lower face of said middle compression ring for collecting fluid leakage past said first spiral-wound gasket said centrally located grooves having drawoff ports therethrough whereby fluid collected in said grooves can be monitored by a sensing device;
      4) a second spiral-wound gasket having an inner and an outer winding, said inner winding wrappingly abutting the outer edge of said middle compression ring; and 5) an outer compression gauge ring, having an inner and an outer edge, said inner edge abutting the outer winding of said second spiral=wound gasket.

b) purging said gasket assembly with a purge carrier fluid; and c) analyzing said purge carrier fluid.

7. A method as in claim 6 wherein said carrier fluid is a purge gas which is selected from nitrogen or helium.

8. A method as in claim 7 further comprising the step of analyzing said process fluid in a mixture of said purge gas and said process fluid.

* * * * *